March 2, 1948.  H. F. MacMILLIN ET AL  2,436,999
METHOD AND APPARATUS FOR PLASTIC INJECTION
Filed April 23, 1943
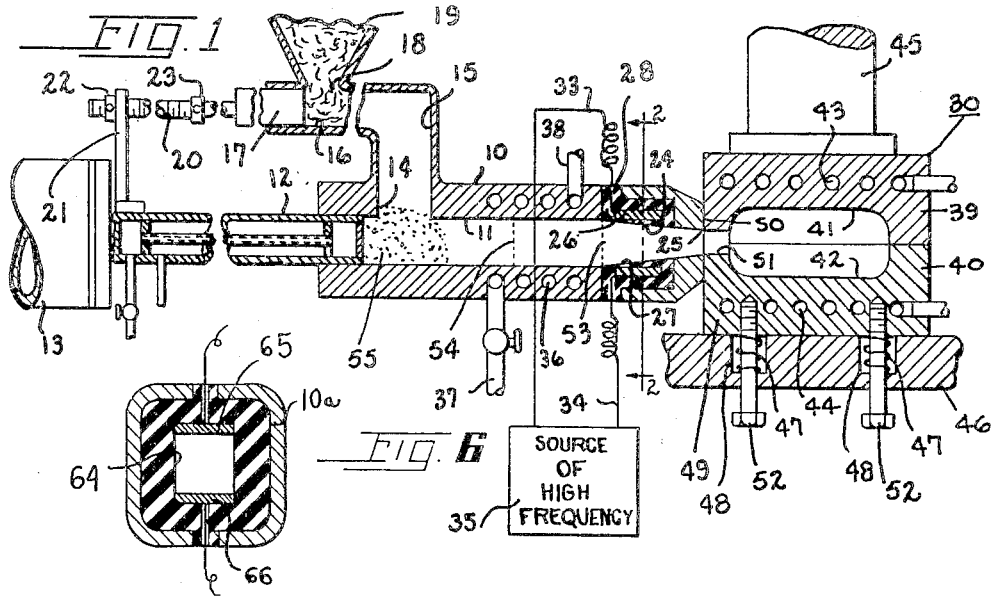
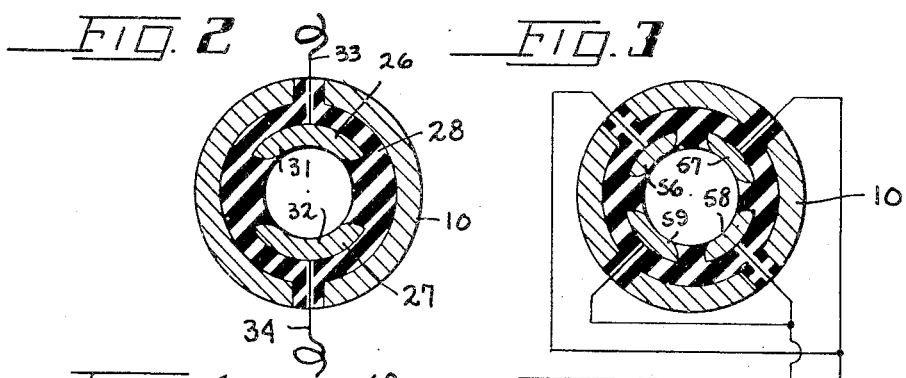
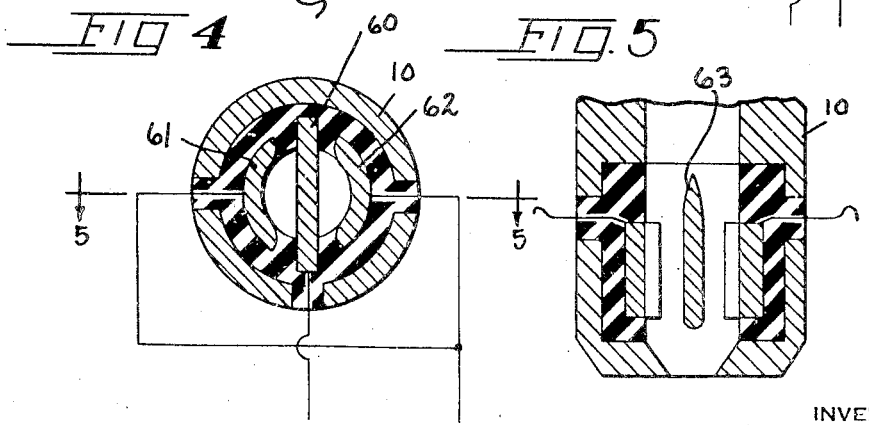
INVENTOR
HOWARD F. MacMILLIN
WALTER ERNST
BY GEORGE A. WALDIE
Toulmin & Toulmin
ATTORNEY Patented Mar. 2, 1948

2,436,999

UNITED STATES PATENT OFFICE 2,436,999

METHOD AND APPARATUS FOR PLASTIC INJECTION

Howard F. MacMillin, Walter Ernst, and George A. Waldie, Mount Gilead, Ohio, assignors to H-P-M Development Corporation, a corporation of Delaware Application April 23, 1943, Serial No. 484,140

8 Claims. (Cl. 18—30)

1

This invention relates to a method and apparatus for heating plastic material progressively within a chamber, the last stages of heating of the plastic material being accomplished by high frequency electrostatic heating so that the plastic material can be rapidly transferred from the cylinder into a mold wherein the material is cured. The process can be applied to either thermosetting or thermoplastic resins but is particularly applicable to thermosetting resins because the plastic material can be raised to a temperature at which polymerization rapidly progresses before transferring the material into the mold so that the cure time within the mold is substantially reduced, regardless of whether the curing is accomplished by the heat evolved from the plastic material due to the exothermic reaction of the material, or by the external application of heat.

An object of the invention is to provide a method of heating plastic material, preferably in progressive stages, within a cylinder wherein the last stage of heating is accomplished by the use of high frequency electrostatic heating so that the material can be transferred in a highly plastic condition into a mold for curing therein.

Another object of the invention is to provide a method of heating plastic material in accordance with the foregoing object wherein the plastic material may be transferred directly from a heating chamber into a mold without the necessity of passing the material through a nozzle as is conventional practice when injecting plasticized plastic material into a mold.

Another object of the invention is to provide a method of heating plastic material and transferring the plasticized material into a mold wherein the plastic material is compacted in its passage through a heating cylinder so that it can be heated uniformly throughout the mass when passing through a high frequency field for increasing the temperature of the material to the desired molding plastic whereby the material can be transferred through a relatively large opening into a suitable mold for curing therein.

Another object of the invention is to provide a method of heating plastic material in accordance with the foregoing objects wherein the charges of plastic material are accurately measured or weighed into the heating cylinder so that each charge of plastic material that is raised to a high temperature for transfer into a mold is completely exhausted from the heating chamber each time a mold is to be filled with plastic material.

Another object of the invention is to provide an apparatus for accomplishing the objects of the process of heating and molding plastic material hereinbefore set forth.

Another object of the invention is to provide

2 an apparatus for heating and molding plastic material wherein the material is heated within a chamber that has a discharge opening of substantially the full diameter of the chamber so that the material heated within the chamber can be transferred rapidly to within a suitable mold.

It is another object of the invention to provide an apparatus in accordance with the foregoing object wherein a gate is provided for closing the end of the heating chamber when a cured article is to be removed from the mold, and which gate may be provided by the mold itself.

Another object of the invention is to provide an apparatus for heating plastic material within a high frequency field whereby the material is heated by electrostatic heating which is constructed and arranged so that the high frequency field is substantially uniform throughout the mass of the plastic material being heated.

Further objects and advantages will become apparent from the drawings and the following description.

In the drawings:

Figure 1 is a longitudinal cross sectional view of an apparatus for performing the process of the invention, the apparatus being shown in somewhat diagrammatic form.

Figure 2 is a transverse cross sectional view taken along line 2—2 of Figure 1 showing the arrangement of the electrodes in the heating chamber for producing a substantially uniform high frequency field within the heating chamber.

Figures 3, 4, 5 and 6 are transverse cross sectional views of the heating chamber showing further arrangements of the electrodes within the heating chamber to obtain substantially uniform distribution of the high frequency field within the heating chamber so that the body of plastic material within the chamber will be uniformly heated throughout its entire mass.

In this invention the applicants make use of relatively high frequency current to establish a high frequency field through which a body of plastic material is passed for heating the same by high frequency electrostatic heating. When the applicants use the term high frequency in this application it is not to be confused with the frequencies used for heating material by the use of induction or magnetic heat which is principally based upon the hysteresis losses in magnetic materials when exposed to a changing magnetic field, but rather the applicants are dealing with high frequencies that are particularly obtainable by high frequency radio frequency apparatus which can develop frequencies with extremely high values such as a million and one-half to ten million cycles. The phenomena of the absorption of energy by electrical insulators causing them to heat up when exposed to an electrostatic field of high frequency has been known for sometime. The usual, and commercially available plastic materials are all relatively good electrical and heat insulating materials so that it has always been a problem to conduct heat through the entire mass of a plastic material uniformly. This is particularly true of heating methods involving conduction heating, the high temperature of the exterior surface of the heating agent being such to overheat the surface of the plastic material while the center of the material was at too low a temperature for satisfactory molding.

The heating effect of electrical insulators when exposed to an electrostatic field of high frequency may be explained as resulting from molecular friction caused by the rapid alterations of the high frequency field. The rate of heating of the plastic material in an electrostatic field is rapid and is uniform throughout the entire mass of the field, the rate of heating of the material being somewhat dependent upon the applied voltage, the frequency, and the loss factor of the material. In general the higher the loss factor of the material, the better is the heating quality of the material when a high frequency field is applied upon the material.

An apparatus for accomplishing the process of heating and molding plastic material of this invention is illustrated diagrammatically in Figure 1 wherein the apparatus consists of a heating chamber 10 having an internal cylinder bore 11 within which a plunger 12 reciprocates, the plunger 12 being connected to the piston of a double-acting hydraulic motor 13.

The cylinder 10 is provided with a feed opening 14 that is connected with the feed chamber 15, the feed chamber 15 having a horizontally extending chamber 16 that receives a piston 17. The chamber 16 has an opening 18 that communicates with a feed hopper 19, whereby granular plastic material from the hopper 19 can be fed into the chamber 16 through the opening 18 when the piston 17 uncovers the opening 18 upon stroking in the leftward direction as viewed in Figure 1. The granular plastic material may be fed into the chamber 16 either by gravity or a suitable force feed can be provided. The piston 17 is connected to a rod 20 that extends through a bracket 21 secured to the plunger 12 and extending upwardly therefrom, the bracket 21 being adapted to engage the collars 22 and 23 on the rod 20 to reciprocate the piston 17 within the chamber 16.

When the plunger 12 is in its completely retracted postion, as shown in Figure 1, the bracket 21 has engaged the collar 22 to move the piston 17 to its full retracted position whereby granular or powdered plastic material can be fed through the opening 18 into the chamber 16. When the plunger 12 moves forward within the cylinder 11, it of course, closes the opening 14 from the feed chamber 15. When the bracket 21 strikes the collar 23 during this forward movement of the plunger 12 the piston 17 will be moved through the chamber 16 to transfer the plastic material from this chamber into the vertical feed chamber 15, the plastic material being retained in the chamber 15 by the plunger 12. The charge of plastic material that is moved into the feed chamber 15 upon each forward stroke of the plunger 12 may be accurately regulated to just equal the charge of plastic material that is transferred from the cylinder 11 into the mold by suitably adjusting the collars 22 and 23 on the rod 20 so that the stroke of the piston 17 will equal that portion of the stroke of the plunger 12 that moves plastic material from the cylinder 11. By properly proportioning the chamber 16 to the cylinder 11, the granular charge of plastic material in the chamber 16 can be made equal to the compressed charge of plastic material in the cylinder 11 when the strokes of the plunger 12 and the piston 17 are of equal duration, this stroke being regulated by the actual stroke of the plunger 12 which moves plastic material from the cylinder 11.

It is thus seen that the apparatus just described provides means for admitting a measured charge of plastic material into the cylinder 11 which will be just equal to the quantity of material required to fill a mold cavity, this measured charge being adjustable by proper location of the stop collars 22 and 23. It is to be understood, of course, that while the applicant has shown one form of an apparatus for accurately measuring a charge of plastic material to be fed to the heating chamber that he is not limited to the specific apparatus shown and that the charge could be accurately weighed as well as measured, the function of this apparatus being solely for the purpose of providing a substantially accurate quantity of material into the heating chamber after each stroke of the plunger 12.

The cylinder bore 11 of the heating cylinder 10 is provided with a tapered portion provided in the forward end of the heating cylinder 10. This tapered portion of the cylinder bore 11 is provided for compacting the granular plastic material in a manner that will be hereinafter described. The tapered portion 24 of the cylinder bore 11 has a discharge opening 25 that is the full diameter of the discharge end of the heating cylinder, thereby eliminating the use of any nozzle or small passage orifice through which the plasticized plastic material must flow when being transferred from the heating cylinder 10 into the mold 30.

The heating cylinder 10 is provided with a pair of electrodes 26 and 27 in the forward end of the cylinder positioned around the tapered portion 24. These electrodes 26 and 27 are imbedded in a body of electrical insulating material 28 that has a low loss factor so that the high frequency electrostatic field set-up between the electrodes 26 and 27 will not produce any high heating of the material. Preferably, the inner surfaces 31 and 32 of the electrodes 26 and 27, respectively, provide the inner surface of the tapered portion 24 of the cylinder bore 11, however, this is not necessary if an electrical material of sufficiently low loss factor is used so that the material between the elctrode and the inner surface of the cylinder bore will not increase in temperature to such an extent as to reduce its rigidity or strength. The electrodes 26 and 27 are connected by means of electrical conductors 33 and 34, respectively, to a source of high frequency 35.

The source of high frequency can be any suitable source preferably of the high frequency radio frequency type for producing the desired high frequency field between the electrodes 26 and 27 whereby the plastic material can be heated as the result of the molecular friction caused by the rapid alterations of the high frequency field. Radio frequency oscillators are commercially available for producing the desired high frequencies and since any one of them can be used as a source of high frequency it is not believed necessary to disclose any particular form of source of high frequency.

The heating cylinder 10 can also be provided with an auxiliary source of heat which may consist of a spiral fluid passage 36 within the wall of the heating chamber having an inlet 37 and an outlet 38 whereby hot fluid is conducted to and from the heating passage 36. This auxiliary source of heat may be in the form of steam, hot oil, electric current or induction heating or any other conventional source of heat and if desired could even be in the form of high frequency electrostatic heating of lower value than that which can be accomplished by the electrodes 26 and 27.

The mold 30 consists of a pair of die members 39 and 40 having cavities 41 and 42 therein that co-operate to form a single mold cavity or a multiple cavity die can be provided for simultaneously molding a plurality of articles. The die members 39 and 40 are provided with fluid conducting passages 43 and 44, respectively, through which a cooling or heating fluid can be circulated for cooling the plastic material within the mold 30 depending upon whether a thermoplastic or thermosetting resin is within the mold 30. The die members are held together under pressure by means of a plunger 45 that forces the same against a stationary bed 46, the plunger 45 being suitably actuated by mechanical, hydraulic or pneumatic means when plastic material is being forced into the die cavity and retained therein under pressure during the cooling period.

As previously described the discharge opening 25 of the heating cylinder 10 is substantially the full diameter of the end of the tapered portion 24 of the cylinder bore 11. Since the plastic material within the heating cylinder 10 is in its most highly plasticized condition when within the tapered portion 24 of the cylinder bore 11 it will be appreciated that a gate will be needed to prevent the plastic material from discharging through the opening 25 when the mold 30 is opened. This gate may take the form of an auxiliary member that is closed upon the opening 25 when the mold 30 is opened and synchronized therewith, or as shown in the drawings the mold itself may provide the gate member.

The lower die is engaged by springs 47 that are retained in recesses 48 provided in the bed 46, these springs 47 urging the lower die 40 in an upward direction whenever the pressure of the plunger 45 is removed as caused by the opening operation of the mold 30. The wall 49 of the lower die 40 engages the front wall 50 of the heating cylinder 10 and slides thereupon so that upward movement of the die 40 will cause the wall 49 to close the opening 25 of the cylinder bore 11. The opening 51 into the mold 30 from the cylinder bore 11, which is of the same size as the opening 25 in the cylinder bore 11, is moved upwardly out of engagement with the opening 25, whereby plasticized material within the heating cylinder 10 will not flow from the cylinder when the mold 30 is opened. Bolts 52 are threaded into the lower die 40 and the heads thereof act as stops to limit the upward movement of the die 40.

*Operation*

When the injection machine of this invention is in operation the heating cylinder 10 is preferably adapted to contain a measured or weighed charge of plastic material in the forward end of the cylinder 10 for heating by means of a high frequency field established between the electrodes 26 and 27, indicated by the dotted line 53, and a second measured or weighed charge of plastic material that is within the auxiliary heating zone produced by the conduit 36, this charge being indicated by the dotted line 54. The machine, as shown in Figure 1, is in a position of operation wherein a fresh granular charge of plastic material 55 has just dropped into the cylinder bore 11 and the two charges 53 and 54 are in the heating chamber in the position as illustrated, the charge 53 being ready for transfer into the cavity of the mold 30.

The source of high frequency 35 has established a high frequency field between the electrodes 26 and 27 so that the charge of plastic material 53 is heated uniformly throughout its mass to a temperature at which the material is in a satisfactory condition of plasticity for transferring into the mold 30. The charge of plastic material 54 is being preheated in the auxiliary heating portion of the cylinder 10 by means of the fluid passing through the heating passage 36. The field of high frequency may be continuously maintained between the electrodes 26 and 27 during the operation of the machine and the hot fluid may be continuously circulated through the heating passage 36 because the machine is adapted for continuous cycle of operation, the heating fluid and the source of high frequency being under suitable control for maintaining a predetermined intensity of heat upon the plastic material so that the intensity of heat and the timed cycle of movement of the plastic material through the cylinder bore 11 will produce a predetermined temperature rise of the material while within the respective heating zones, or if desired suitable controls could be provided for regulating the sources of heat in response to the temperature of the material within the respective heating zones.

With the machine in condition as shown in Figure 1, the plunger 12 is moved forward by means of the hydraulic motor 13 to advance the charge of plastic material 55 into the cylinder bore 11 whereby the charge of plastic material 53, now in a satisfactory plastic condition for molding, is transferred from the heating zone between the electrodes 26 and 27 into the cavity of the mold 30 and the preheated charge of plastic material 54 is moved from the preheating zone into the high frequency zone for completing the temperature rise of the material, the charge of plastic material 55 moving into the preheating zone. Since the charges of plastic material have been accurately measured or weighed, and the plunger 12 takes a predetermined stroke, the complete charge of plastic material 53 will be transferred into the mold 30 so that there will be no high temperature plastic material remaining in the tapered portion 24 of the cylinder bore 11 when the plunger 12 is at its extreme forward position.

This operation is particularly desirable when using thermosetting resins because the resin within the high frequency field between the electrodes 26 and 27 can be raised to a sufficiently high temperature for producing a rapid polymerization of the plastic material and yet can be moved from this heating zone through the large openings 25 and 51 into the mold 30 at a rapid rate so that the material will all be transferred from the heating zone into the mold 30 before polymerization is complete. When the thermosetting resin has been transferred into the mold 30 it can then cure therein either by the external application of heat or by the heat generated due to the exothermic reaction of the material.

The charge of plastic material 54 can be preheated to a temperature that is sufficiently low that polymerization does not proceed at a very rapid rate so that its heating time can be prolonged in the preheating chamber without danger of setting of the thermosetting resin in the chamber and the temperature of the material will not be raised to the point at which rapid polymerization progresses until it has been transferred into the high frequency field between the electrodes 26 and 27. Preheating of the plastic material by conduction of heat through the material provides an economical method of initially raising the temperature of the granular plastic material so that the actual power requirement for raising the material to suitable molding condition is less and the time element can be shortened. This is true regardless of whether thermosetting or thermoplastic material is being worked in the injection machine. The method of heating therefore decreases the actual heating time and permits an increase in the cycle of operation in the machine so that a greater production capacity of the machine can be obtained.

The tapered portion 24 of the cylinder bore 11 provides a compacting of the plastic material as it enters the high frequency field to increase the density of the material and thus increase the uniformity by which it will be heated throughout the entire mass, or this tapered portion may be omitted if desired and this portion of the cylinder bore be made uniform in diameter with the remaining portion.

While the operation of the machine has been described as including the preheating step for the charges of plastic material, yet it will be understood that this preheating step can be omitted if desired, it only being necessary to increase the intensity of the high frequency field to heat the material within the same period of time as would occur with the preheating step or the heating time within the high frequency field can be increased if the intensity of the field is not to be increased.

In Figure 3 there is shown an arrangement of electrodes for increasing the uniformity of the high frequency field within the cylinder bore 11. In the construction shown in this figure the heating cylinder 10 is provided with four electrodes 56, 57, 58 and 59 spaced equidistantly around the cylinder bore 11, the electrodes 56 and 58 oppose one another as do electrodes 57 and 59 to provide a field wherein high frequency current will flow in straight line paths between electrodes 56 and 58 and electrodes 57 and 59, and also curve line paths between electrodes 56, 57 and 58, 59, whereby the entire field within the cylinder bore is well covered by high frequency oscillations.

In Figures 4 and 5 there is shown an arrangement of electrodes in the heating cylinder 10 wherein there is provided a central electrode 60 and a pair of side electrodes 61 and 62, the electrode 60 being connected to one side of the source of high frequency and the electrodes 61 and 62 being connected to the opposite side of the source of high frequency. In this arrangement the field of high frequency is set up between the central electrode and two side electrodes, and will be relatively uniform therebetween because as it will be noted the ends of side electrodes 61 and 62 are curved to prevent them from being spaced closely adjacent the central electrode 60. In Figure 5 it will be noted that the central electrode 60 is provided with a tapered forward end 63 which will permit the plastic material to flow evenly on both sides of the electrode without producing any substantial resistance to the forward movement of the plastic material.

In Figure 6 there is illustrated a heating cylinder 10a having a square internal bore 64 having electrodes 65 and 66 positioned on opposite sides of the square bore 64 so that there will be provided a uniform field of high frequency between the electrodes and through the mass of plastic material within the bore 64.

While the apparatus and process disclosed herein constitutes a preferred form of the invention, yet it is to be understood that modifications of the general invention described can be used without departing from the spirit of the invention and that all such modifications as fall within the scope of the appended claims are intended to be included herein.

Having thus fully described our invention, what we claim as new and desire to secure by Letters Patent is:

1. An apparatus for heating and molding plastic material that includes, a heating cylinder, means for feeding measured charges of plastic material to said cylinder, means for advancing the charges of plastic material through the cylinder in predetermined increments, means for producing a field of high frequency in the forward end of said cylinder consisting of a pair of electrodes adapted to be connected to a source of high frequency that are positioned in insulating means within said cylinder, and a discharge opening for said cylinder of large size capable of passing large quantities of plasticized material with minimum resistance to flow when relatively low pressure is applied upon the plastic material within the cylinder.

2. An apparatus for heating and molding plastic material that includes, a heating cylinder, means for feeding measured charges of plastic material to said cylinder, means for advancing the charges of plastic material through the cylinder in predetermined increments, means for producing a field of high frequency in the forward end of said cylinder consisting of a plurality of electrodes positioned within an insulating sleeve secured within said cylinder and disposed equidistantly about the inner periphery of said cylinder, and a discharge opening for said cylinder of large size capable of passing large quantities of plasticized material with minimum resistance to flow when relatively low pressure is applied upon the plastic material within the cylinder.

3. An apparatus for heating and molding plastic material that includes, a heating cylinder, means for feeding measured charges of plastic material to said cylinder, means for advancing the charges of plastic material through the cylinder in predetermined increments, means for producing a field of high frequency in the forward end of said cylinder consisting of an electrode positioned transversely across the axis of said cylinder and an electrode disposed on each side of said first electrode, said electrodes being carried by an insulating sleeve within said cylinder, and a discharge opening for said cylinder of large size capable of passing large quantities of plasticized material with minimum resistance to flow when relatively low pressure is applied upon the plastic material within the cylinder.

4. A method of heating and molding resins in an injection molding machine that comprises, feeding measured charges of resin substantially equal to the volume of a mold to be filled into the injection cylinder of an injection machine, moving the resin charges through the injection cylinder in increments equal to the volume occupied by the individual charges in the injection cylinder, holding the temperature of the resin in its movement through the injection cylinder to a temperature below a satisfactory plasticizing molding temperature except at the discharge end of the injection cylinder, producing a zone of high frequency energy in the discharge end of the injection cylinder equivalent to the space occupied by a single charge of resin therein to heat the said entire charge simultaneously and uniformly throughout its mass while within the injection cylinder to an elevated plasticizing molding temperature, and discharging the complete said heated charge from the injection cylinder by said incremental movement of all charges therein.

5. A method of heating and molding resins in an injection molding machine that comprises, feeding measured charges of resin substantially equal to the volume of a mold to be filled into the injection cylinder of an injection machine, moving the resin charges through the injection cylinder in increments equal to the volume occupied by the individual charges in the injection cylinder, holding the temperature of the resin in its movement through the injection cylinder to a temperature below a satisfactory plasticizing molding temperature except at the discharge end of the injection cylinder, producing a zone of high frequency energy in the discharge end of the injection cylinder equivalent to the space occupied by a single charge of resin therein to heat the said entire charge simultaneously and uniformly throughout its mass while within the injection cylinder to an elevated plasticizing molding temperature, and discharging the complete said heated charge from within the said zone directly into a cavity for molding thereof.

6. A method of heating and molding resins in an injection molding machine that comprises, feeding measured charges of resin substantially equal to the volume of a mold to be filled into the injection cylinder of an injection machine, moving the resin charges through the injection cylinder in increments equal to the volume occupied by the individual charges in the injection cylinder, holding the temperature of the resin in its movement through the injection cylinder to a temperature below a satisfactory plasticizing molding temperature except at the discharge end of the injection cylinder, producing a zone of high frequency energy in the discharge end of the injection cylinder equivalent to the space occupied by a single charge of resin therein to heat the said entire charge simultaneously and uniformly throughout its mass while within the injection cylinder to an elevated plasticizing molding temperature, and discharging the complete said heated charge from within the said zone directly into a cavity for molding thereof through an opening between the injection chamber and a mold of sufficient size to pass a large volume of resin in a short period of time with only minor resistance to the flow of the resin.

7. A method of heating and molding thermosetting resins in an injection molding machine that comprises, feeding measured charges of resin substantially equal to the volume of a mold to be filled into the injection cylinder of an injection machine, moving the resin charges through the injection cylinder in increments equal to the volume occupied by the individual charges in the injection cylinder, holding the temperature of the resin in its movement through the injection cylinder at an elevated temperature above room temperature but below a satisfactory plasticizing molding temperature at which the thermosetting resin polymerizes rapidly except at the discharge end of the injection cylinder, producing a zone of high frequency energy in the discharge end of the injection cylinder equivalent to the space occupied by a single charge of resin therein to heat the said entire charge simultaneously and uniformly throughout its mass while within the injection cylinder to an elevated plasticizing molding temperature at which polymerization of the resin proceeeds rapidly, and discharging the complete said heated charge from within the said zone directly into a cavity for molding thereof.

8. A method of heating and molding thermosetting resins in an injection molding machine that comprises, feeding measured charges of resin substantially equal to the volume of a mold to be filled into the injection cylinder of an injection machine, moving the resin charges through the injection cylinder in increments equal to the volume occupied by the individual charges in the injection cylinder, holding the temperature of the resin in its movement through the injection cylinder at an elevated temperature above room temperature but below a satisfactory plasticizing molding temperature at which the thermosetting resin polymerizes rapidly except at the discharge end of the injection cylinder, producing a zone of high frequency energy in the discharge end of the injection cylinder equivalent to the space occupied by a single charge of resin therein to heat the said entire charge simultaneously and uniformly throughout its mass while within the injection cylinder to an elevated plasticizing molding temperature at which polymerization of the resin proceeeds rapidly, and discharging the complete said heated charge from within the said zone directly into a cavity for molding thereof through an opening between the injection chamber and a mold of sufficient size to pass a large volume of resin in a short period of time with only minor resistance to the flow of the resin.

HOWARD F. MacMILLIN.
WALTER ERNST.
GEORGE A. WALDIE.

REFERENCES CITED

The following references are of record in the file of this patent:

UNITED STATES PATENTS

| Number | Name | Date |
| --- | --- | --- |
| 2,179,261 | Keller | Nov. 7, 1939 |
| 2,269,880 | Morin et al. | Jan. 13, 1942 |
| 2,296,295 | Shaw | Sept. 22, 1942 |
| 2,296,948 | Pitman | Sept. 29, 1942 |
| 2,309,496 | Bird et al. | Jan. 26, 1943 |
| 2,319,482 | Tucker | May 18, 1943 |
| 2,370,883 | Smith | Mar. 6, 1945 |